United States Patent [19]

Boham et al.

[11] 4,013,276
[45] Mar. 22, 1977

[54] EXTRUDERS AND INJECTION MOULDING MACHINES

[75] Inventors: Ambrose C. Boham; John C. Davies; Brian J. Kendall-Smith, all of Birmingham, England

[73] Assignee: British Industrial Plastics Limited, Manchester, England

[22] Filed: Mar. 19, 1975

[21] Appl. No.: 559,980

[52] U.S. Cl. .................................. 259/191; 259/97
[51] Int. Cl.² ........................................... B29B 1/10
[58] Field of Search .......... 259/191, 192, 193, 194, 259/9, 10, 25, 26, 45, 46, 97; 425/207, 208, 209; 100/145

[56] References Cited

UNITED STATES PATENTS

| 1,427,272 | 8/1922 | Eger | 259/191 |
|---|---|---|---|
| 2,471,324 | 5/1949 | Henning | 259/193 |
| 3,150,411 | 9/1964 | Daubenfeld | 259/191 |
| 3,458,894 | 8/1969 | Wheeler | 259/191 |
| 3,638,921 | 2/1972 | Bredeson et al. | 259/9 X |
| 3,799,510 | 3/1974 | Schott, Jr. | 259/191 |

*Primary Examiner*—Edward J. McCarthy
*Attorney, Agent, or Firm*—Diller, Brown, Ramik & Wight

[57] ABSTRACT

A screw-housing for an extruder or injection moulding machine, having a longitudinal bore on the internal surface of which is defined grooving, preferably in the form of a number of equidistantly spaced grooves, extending longitudinally throughout substantially the whole length of the housing or alternatively throughout a major portion of the length of the housing downstream of the feed zone thereof.

6 Claims, 5 Drawing Figures

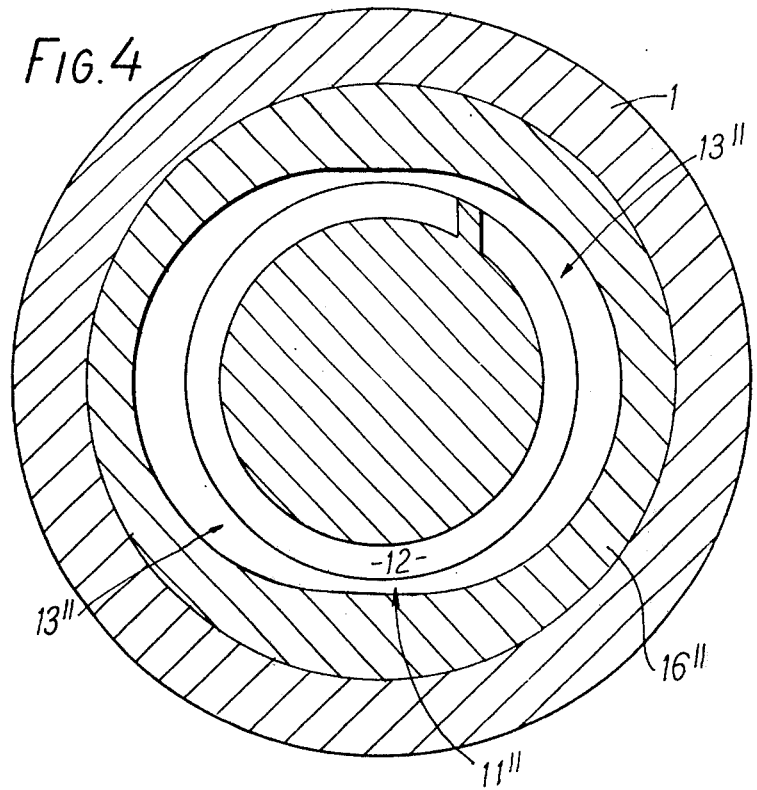
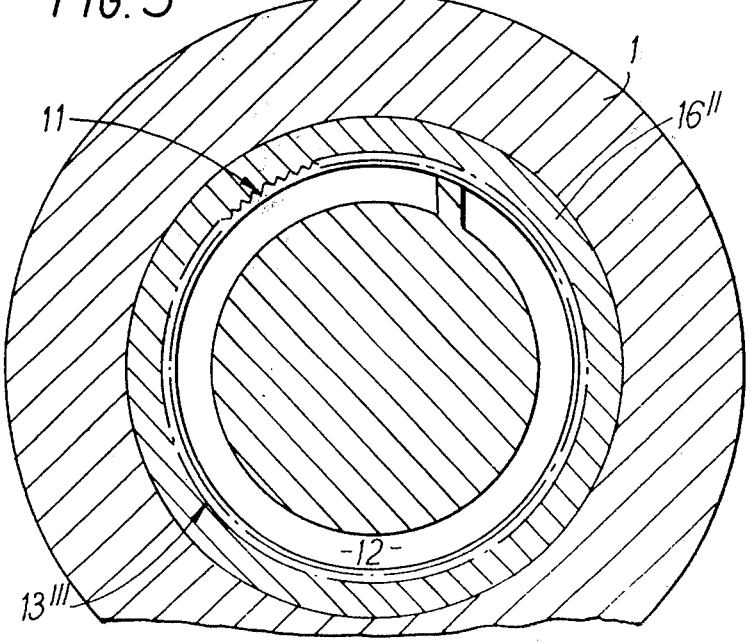

EXTRUDERS AND INJECTION MOULDING MACHINES

This invention concerns improvements in or relating to extruders and injection moulding machines.

It has already been proposed to provide longitudinal grooves in the feed zone of the screw-housing of an extruder or injection moulding machine to encourage feeding of plastics materials through the housing. Frequently, the feed zone has a frusto-conical configuration. We have determined that in many cases it is not, in fact, possible to extrude or injection mould thermosetting plastics materials in fine powder form using machinery having grooves in the feed zone as indicated above.

According to the present invention, there is provided a screw-housing for an extruder or injection moulding machine, within which screw-housing there is defined a bore having grooving extending longitudinally (a) throughout substantially the whole length of the housing or (b) throughout a major portion of the length of the housing down-stream of the feed zone thereof.

Thus the bore defined in the screw-housing may be provided with no grooving at its feed zone, or may have grooving which extends through the feed zone and through its mid-section and outlet end. Preferably the bore defined in the screw-housing will have a constant cross-section throughout substantially the whole of its length, although it may have a cross section which varies along its length, for example by having a feed section which is of conical configuration and mid- and outlet sections which are of constantly cylindrical cross-section.

The grooving may be a single groove, but preferably consists of two or more grooves circumferentially spaced around the bore; preferably the grooves will be equidistantly spaced, although they need not be.

Preferably, also, the or each groove will have a uniform cross-section along the major portion of its length.

The cross-sectional shape of the or each groove preferably is semi-elliptical or semi-circular, although it may be trapezodial or rectangular if desired. Rounded surfaces provide for reduced possibility of "clogging" of the grooving by curing of moulding material in the grooving. The grooving may be constituted in the form of a helix, of a "hand" the same as or opposite to that of the screw destined to be mounted for rotation (or for rotation and reciprocation) in the screw-housing. The bore provided with grooving in accordance with this invention may be the bore of bushing provided as a close fit within the bore of a screw-housing.

The present invention also provides an extruder, or an injection moulding machine, fitted with a screw-housing as aforesaid.

A presently preferred embodiment of the present invention will now be described by way of example, with reference to the accompanying drawings, wherein:

FIGS. 4 and 5 are similar cross-sections of further modifications.

Figure 1:
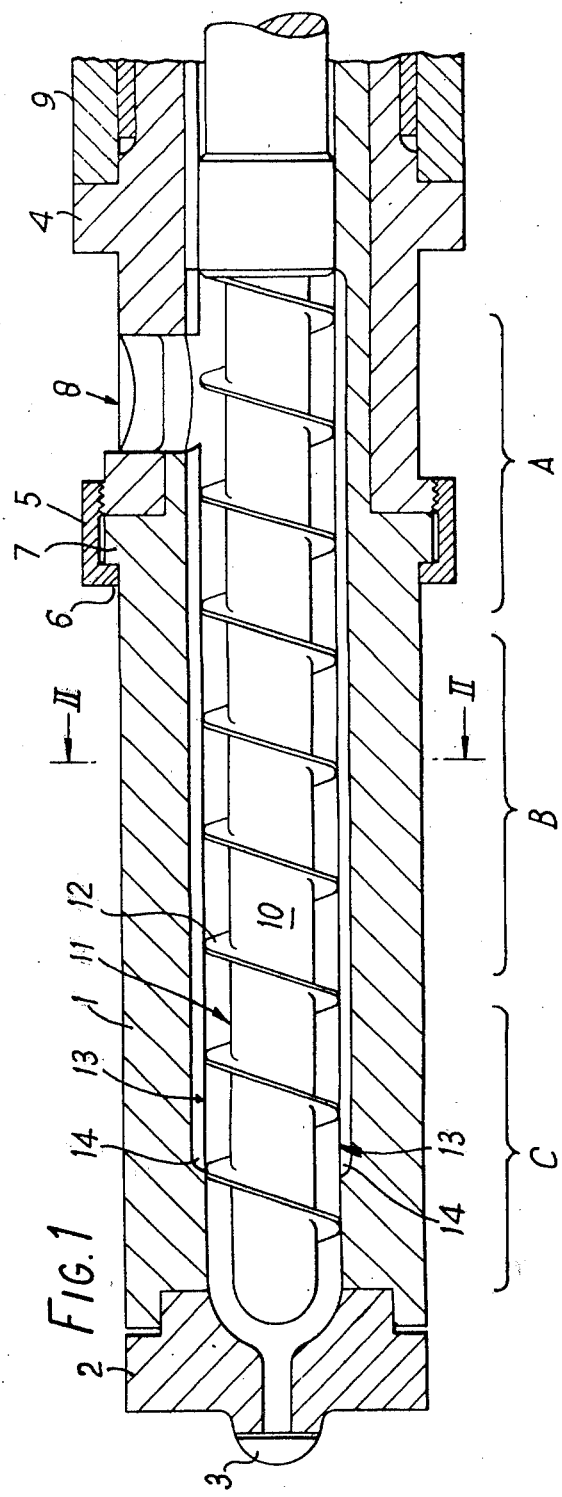
FIG. 1 is a diagrammatic longitudinal cross-section (not to scale), of part of an injection moulding machine.
Figure 2:
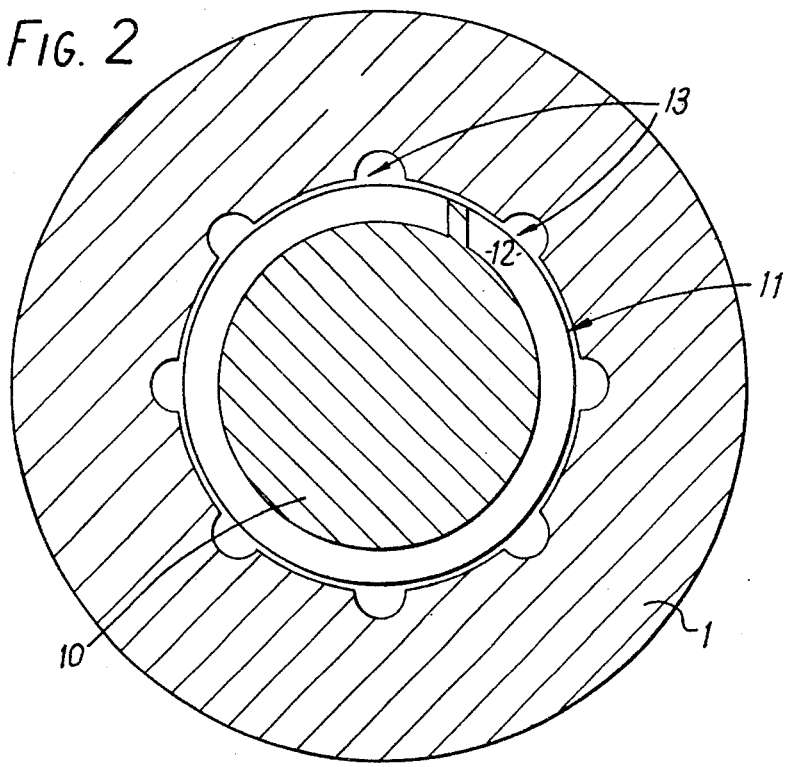
FIG. 2 is an enlarged cross-section of the barrel thereof on the line II—II.

Referring to FIGS. 1 and 2, an injection moulding machine has a barrel which comprises a screw-housing 1 having a barrel cap 2 and a nozzle 3 at its outlet end, and a feeder member 4, having a feed opening 8, adjacent the upstream or feed zone end of the screw-housing. The feeder member 4 is secured to the screw-housing by a threaded retaining ring 5 having an abutment 6 engaging flange 7 on the screw-housing. The barrel is secured to a portion of the body 9 of the injection moulding machine by suitable means (not shown) such as threaded bolts and co-operating nuts.

Mounted for rotation and reciprocation in the bore 11 of the barrel in known manner is a screw 10 having a single flight 12 of constant pitch. The inner surface of the bore of the screw-housing is provided with grooving in the form of eight radially spaced grooves 13 of semi-circular cross-section, these grooves extending throughout the feed zone A, mid-section B and outlet C of the screw-housing and being of substantially constant cross-section except for a short taper 14 at the downstream end thereof.

The injection moulding machine can be used for moulding plastics articles from thermosetting plastics material in fine powder form. In operation, the fine powder is permitted entry to the screw via feed opening 8, for example from a hopper (not shown) incorporating an agitator and is progressed along the screw-housing on rotation of the screw, filling the unoccupied portions of the bore 11 and the grooves 13. The thermosetting plastics material in the grooves 13 inhibits rotation of the material carried forward by the screw and thus tends to prevent "screw slip" i.e. rotation of the screw without forward movement of the material in the bore. Thus movement of the material from the feed zone to the nozzle is facilitated.

Figure 3:
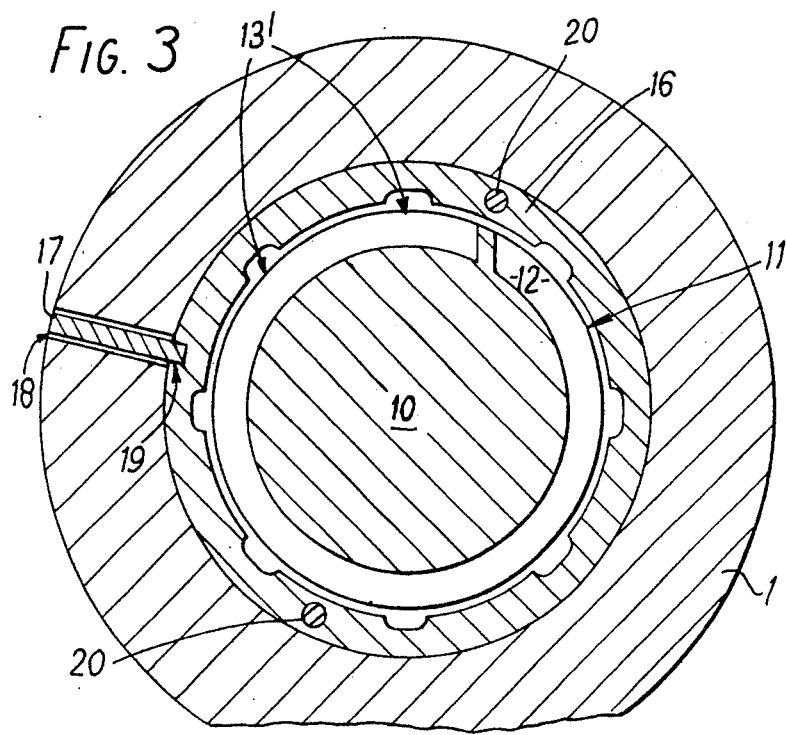
FIG. 3 is a similar cross-section of a modification.

FIG. 3 illustrates a modification, wherein elliptical grooving 13' is provided on the surface of the bore of bushing 16 which is a close-fit within and is removable from the screw-housing 1. This obviates the need for providing several expensive screw-housings for each machine, each housing having a different form of grooving from the others for different injection moulding procedures. The provision of a set of interchangeable bushings having different forms of grooving is more economic and may facilitate stripping and cleaning of the machine in the event of material "setting off" in the barrel.

To obviate rotation of the bushing 16 in the screwhousing 1, the barrel is provided with locking means in the form of splining, or, as shown in FIG. 3, at least one aperture or longitudinal slot 19 capable of registering with at least one orifice 18 provided in the housing 1, and a stud 17 securable in the orifice 18 (for example by means of threading) and projecting into the corresponding aperture of slot 19. To facilitate manufacture of the bushing 16 and location thereof in the bore 11, the bushing may be formed as a plurality of sections, each registering with its neighbour(s) by positive location means such as spigots 20 on one bushing section locatable in corresponding holes (not shown) in a neighbouring section, to facilitate abutment and register of the sections.

FIGS. 4 and 5 exemplify respectively the two extremes of grooving. In FIG. 4, the grooving is formed as two large diametrically opposed grooves 13", resulting in the bore 11" in bushing 16" having essentially an elliptical or oblate spheroidal cros-section, whilst in FIG. 5, the grooving is formed as a large number of small shallow grooves or scrathces 13''' as may be achieved by roughly milling the wall of the bore 11. It will be appreciated that whatever form the grooving takes, it is preferably of the same form throughout the length of the housing (or throughout the major portion of the length of the housing downstream of the feed zone thereof).

The number, disposition and shape of the grooves forming the grooving to be used in any particular application will depend to some extent on the type of material to be processed, and on the desired operating conditions of the machine; however, to those skilled in the art, the selection of the desired form of grooving should present no difficulty, requiring only relatively simple experimentation.

The invention is further illustrated, in a preferred embodiment, by the following comparative example:

EXAMPLE

A. Attempts were made to injection mould a urea-formaldehyde moulding material in fine powder form in a standard 'BIPEL' 155/50 injection moulding machine (BIPEL is a Registered Trade Mark), having an agitated hopper, to form 13 amp electric plug covers. This standard machine had no grooving in the barrel. These attempts were unsuccessful, in spite of variation of the conditions of operation of the machine.

B. A different screw-housing, having eight longitudinal rectangular cross-section grooves, each 11/32 inch (8.17 mm) wide by 1/64 inch (0.4 mm) deep by 10 inches (2.54 mm) long located only at the feed zone C, was used in the aforesaid machine for the same attempted purpose; again the attempts to mould 13 amp electric plug covers satisfactorily from the fine powder material were unsuccessful.

Alterations to the dimensions of the grooves in the feed zone did not lead to a successful result.

C. A screw-housing as described above with reference to FIGS. 1 and 2, having eight semi-elliptical grooves 8.17 mm wide by 0.4 mm deep, was fitted to the injection moulding machine, and 13 amp electric plug covers were successfully moulded from the fine powder material, using the conditions listed below, showing that grooving extending substantially the whole length of the screw-housing provides the necessary feeding and plasticizing characteristics to enable a thermosetting plastics material in fine powder form to be injection moulded successfully.

Barrel Temperatures ° C
   Main Zone — 90° C (Zones B and C FIG. 1)
   Feed Zone A — 45° C (Heat picked up from main zone)
Mould Temperature ° C
   Fixed Part — 140° C
   Moving Part — 140° C
Injection Speed (seconds): — 5
Injection Pressure (PSIG): — Maximum
Hold on Pressure (PSIG): — 600
Screw Speed (RPM): — 50
Screw Back Time (seconds): — 12
Back Pressure (PSIG): — 80
Sprue Break Selection: — 2 seconds after screw-back
Injection Timer (seconds): — 10
Cycle Time (seconds): — 20
Screw stroke: — 2 inches

We claim:

1. A screw-housing for extruder and injection moulding machines, within which screw-housing there is defined a longitudinally extending bore for reception of a rotary screw, said bore having a feed zone characterised in that said screw-housing is particularly adapted for the feeding of thermosetting plastics material in the form of a fine powder and in the internal surface of the bore there is defined grooving which extends longitudinally throughout a major portion of the length of the screw-housing downstream of the feed zone thereof, said bore terminating in a discharge opening, and said grooving terminating in spaced relation to that part of said bore coupled to said discharge opening wherein a terminal portion of said bore is free of said grooving.

2. A screw-housing as defined in claim 1, wherein the bore within which the grooving is defined is itself defined in a bushing adapted to fit closely in a primary bore defined by the screw-housing, said bushing being formed as a plurality of sections, and said sections being provided with positive location means for facilitating abutment of adjacent ones of said sections.

3. A moulding machine having a screw-housing as defined in claim 1.

4. A screw-housing as defined in claim 1, wherein said grooving extends substantially the whole length of said screw-housing.

5. A feeder for thermosetting use as part of an extruder for plastics materials, said feeder comprising a screw-housing defining an elongated bore, said screw-housing having a feed opening defining a feed zone and a discharge spaced longitudinally of said bore, a feed screw rotatably mounted in said bore, and means on said screw-housing cooperable with said feed screw and fine powder thermosetting plastics material within said bore for inhibiting rotation of the material with said feed screw and thus assuring movement of the material along said bore, said screw-housing having an internal surface defining said bore, said means being in the form of grooving in said internal surface, said grooving extending longitudinally throughout a major portion of the length of said bore downstream of said feed zone, said grooving beginning at a point in advance of said feed opening.

6. A method of enchancing the feeding of a thermosetting plastics material in the form of a fine powder utilizing a feeder of the type including a screw-housing having internal surface defining a bore, a feed opening in said screw-housing defining a feed zone and a discharge spaced longitudinally of the bore, and a feed screw mounted in the bore for rotation; said method comprising the steps of providing grooving in the screw-housing interior surface extending longitudinally of the bore throughout a major portion of the bore downstream of the feed zone, the grooving beginning at a point in advance of the feed opening.

* * * * *

UNITED STATES PATENT OFFICE
CERTIFICATE OF CORRECTION

PATENT NO. : 4,013,276
DATED : March 22, 1977
INVENTOR(S) : Ambrose C. Boham, et al It is certified that error appears in the above-identified patent and that said Letters Patent are hereby corrected as shown below:

In the heading, insert:

Claims priority, application
      Great Britain, April 10, 1974,
      No. 15,987/74

Signed and Sealed this

Twenty-first Day of March 1978

[SEAL]

Attest:

RUTH C. MASON
*Attesting Officer*

LUTRELLE F. PARKER
*Acting Commissioner of Patents and Trademarks*